United States Patent
Hashimoto et al.

(10) Patent No.: US 11,423,663 B2
(45) Date of Patent: Aug. 23, 2022

(54) OBJECT DETECTION DEVICE, OBJECT DETECTION METHOD, AND NON-TRANSITORY COMPUTER READABLE MEDIUM COMPRISING COMPUTER PROGRAM FOR OBJECT DETECTION-USE

(71) Applicant: TOYOTA JIDOSHA KABUSHIKI KAISHA, Toyota (JP)

(72) Inventors: Daisuke Hashimoto, Chofu (JP); Satoshi Takeyasu, Musashino (JP); Kota Hirano, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 16/571,635

(22) Filed: Sep. 16, 2019

(65) Prior Publication Data

US 2020/0097740 A1  Mar. 26, 2020

(30) Foreign Application Priority Data

Sep. 26, 2018 (JP) .............................. JP2018-180489

(51) Int. Cl.
*G06T 7/70* (2017.01)
*G06V 20/58* (2022.01)
*B60R 1/02* (2006.01)
*G06T 7/80* (2017.01)
*B60R 1/12* (2006.01)

(52) U.S. Cl.
CPC ............... *G06V 20/58* (2022.01); *B60R 1/02* (2013.01); *G06T 7/70* (2017.01); *G06T 7/80* (2017.01); *B60R 2001/1253* (2013.01)

(58) Field of Classification Search
CPC ................ G06T 7/70; G06T 7/80; B06R 1/02
See application file for complete search history.

(56) References Cited

U.S. PATENT DOCUMENTS

2018/0181824 A1 * 6/2018 Ishii ................... G08G 1/09623
2019/0149752 A1   5/2019 Takahashi et al.

FOREIGN PATENT DOCUMENTS

JP   2018-106668 A   7/2018
JP   2018-107759 A   7/2018

OTHER PUBLICATIONS

Wei Liu et al., "SSD: Single Shot MultiBox Detector", ECCV2016, 2016.

* cited by examiner

*Primary Examiner* — Myron Wyche
(74) *Attorney, Agent, or Firm* — Sughrue Mion, PLLC

(57) ABSTRACT

An object detection device comprising a first detecting part detecting types and positions of objects including a road mirror in an image and a presence of a movable object reflected in the road mirror based on image data of a low resolution image and a second detecting part detecting a type of the movable object in the road mirror and a position of the movable object in the road mirror based on high resolution partial image data obtained by extracting the part of the road mirror from the image if there is a movable object reflected in the road mirror.

8 Claims, 7 Drawing Sheets

OBJECT DETECTION DEVICE, OBJECT DETECTION METHOD, AND NON-TRANSITORY COMPUTER READABLE MEDIUM COMPRISING COMPUTER PROGRAM FOR OBJECT DETECTION-USE

FIELD

The present disclosure relates to an object detection device, object detection method, non-transitory computer readable medium comprising computer program for object detection-use.

BACKGROUND

Non-patent literature 1 (Wei Liu et al., "SSD: Single Shot MultiBox Detector", ECCV2016, 2016) discloses an object detection device using a deep neural network (below, referred to as a "DNN") learned by using images in which vehicles and other known objects are captured as teacher data to detect a type and position of an object captured in an image input to the DNN.

SUMMARY

In recent years, self-driving cars have been being developed equipped with such object detection devices. To improve the safety of self-driving cars, it is desirable to not only detect an object in an image captured by a camera etc., but also, if there is a road mirror in the image captured by the camera etc., detect an object reflected in the road mirror, for example, a pedestrian or car, motorcycle, bicycle, or other object able to move (below, referred to as a "moving object"), that is, a moving object present at a dead angle of the image captured by the camera etc., and prepare a driving plan for the vehicle considering the behavior of the moving object present at the dead angle.

However, what is described in the above-mentioned non-patent literature 1 did not take note of a moving object reflected in a road mirror and detect that moving object. For this reason, if trying to pick up even an extremely small moving object reflected in a road mirror and make it possible to precisely detect that moving object, the amount of processing becomes greater. If the processing resources which can be utilized for detecting an object are limited or if a real time property is demanded, there is the problem that it is difficult to detect a moving object reflected in a road mirror.

The present disclosure was made focusing on such a problem and has as its object to keep down the amount of processing while enabling precise detection of a moving object reflected in a road mirror.

To solve this problem, according to one aspect of the present disclosure, there is provided an object detection device provided with a first detecting part detecting types and positions of objects including a road mirror in an image and a presence of a reflected object reflected in the road mirror based on image data of a low resolution image and a second detecting part detecting a movable object in the road mirror and a position of the movable object in the road mirror based on high resolution partial image data obtained by extracting the part of the road mirror from an image if there is a reflected object.

Further, according to another aspect of the present disclosure, there is provided an object detection method detecting types and positions of objects including a road mirror in an image and a presence of a reflected object reflected in the road mirror based on image data of a low resolution image and detecting a movable object in the road mirror and a position of the movable object in the road mirror based on high resolution partial image data obtained by extracting the part of the road mirror from an image if there is a reflected object.

Further, according to another aspect of the present disclosure, there is provided a non-transitory computer readable medium comprising a computer program for object detection-use including instructions for making a computer detect types and positions of objects including a road mirror in an image and a presence of a reflected object reflected in the road mirror based on image data of a low resolution image and detect a movable object in the road mirror and a position of the movable object in the road mirror based on high resolution partial image data obtained by extracting the part of the road mirror from an image if there is a reflected object.

According to the object detection device, object detection method, and non-transitory computer readable medium comprising computer program for object detection-use according to these aspects of the present disclosure, it is possible to keep down the amount of processing while enabling precise detection of a moving object reflected in a road mirror.

DESCRIPTION OF EMBODIMENTS

Figure 1:
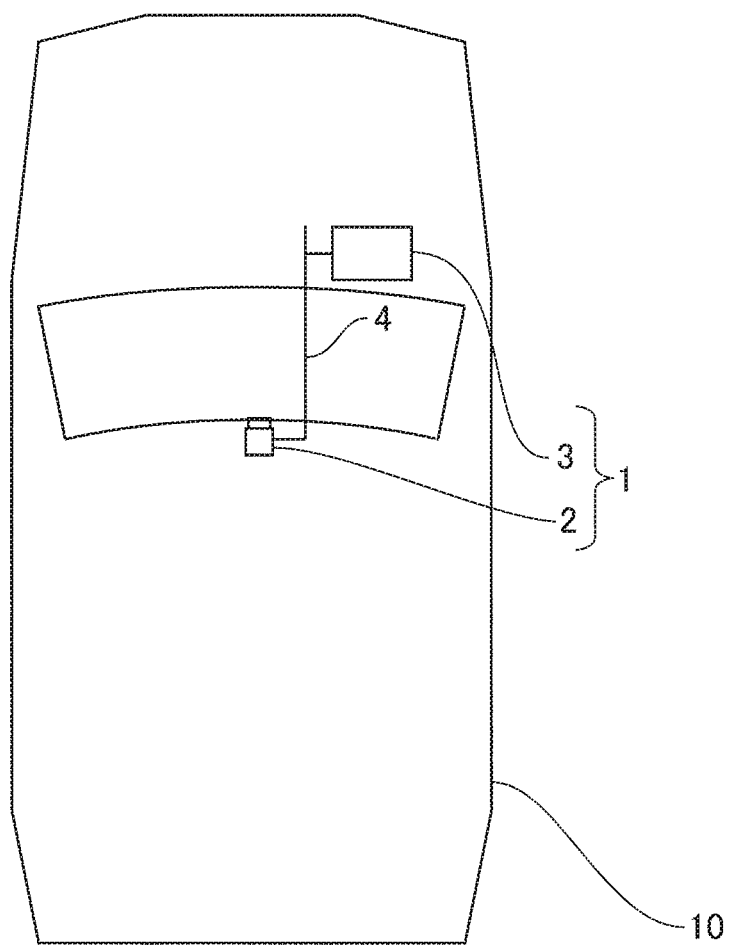
FIG. 1 is a schematic view of a configuration of a vehicle control system in which an object detection device is mounted.

Below, referring to the drawings, embodiments of the present disclosure will be explained in detail. Note that, in the following description, similar components will be assigned the same reference notations.

Figure 2:
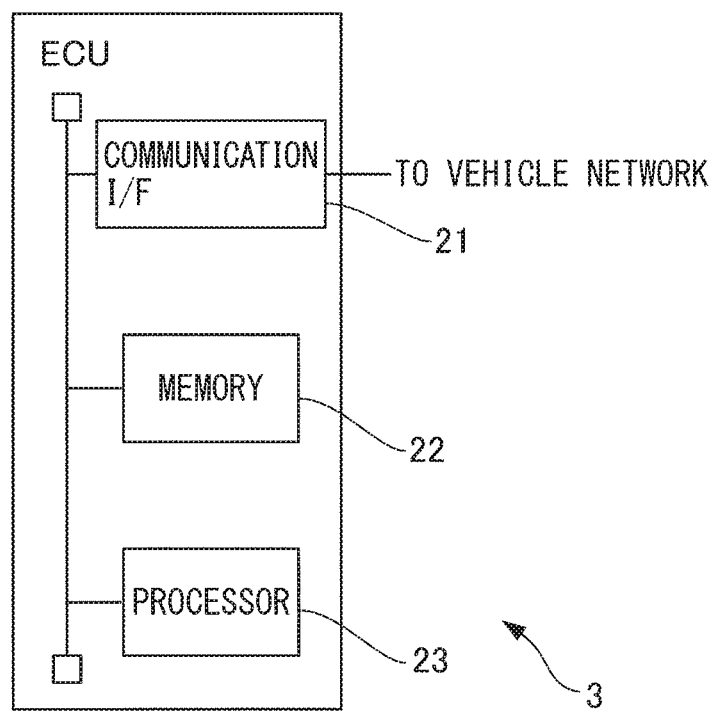
FIG. 2 is a view of a hardware configuration of an electronic control unit of one embodiment of an object detection device.

FIG. 1 is a schematic view of the configuration of a vehicle control system in which an object detection device is mounted. FIG. 2 is a view of a hardware configuration of an electronic control unit of one embodiment of the object detection device.

In the present embodiment, a vehicle control system 1 mounted in a vehicle 10 and controlling the vehicle 10 has a camera 2 for capturing an image of the surroundings of the vehicle 10 and an electronic control unit (ECU) 3 functioning as an object detection device and a vehicle control device. The camera 2 and the ECU 3 are connected to be able to communicate through a vehicle network 4 based on a controller area network standard.

The camera 2 is one example of an imaging part and has a two-dimensional detector comprised of an array of CCDs or C-MOS's or other photoelectric conversion elements having sensitivity to visible light and an image-forming optical system forming an image of a region to be captured on this two-dimensional detector. The camera 2 is attached for example inside a passenger compartment of the vehicle 10 so as to face a region in front of the vehicle 10. Further, the camera 2 captures the region in front of the vehicle 10 at each predetermined image capturing period (for example 1/30 seconds to 1/10 seconds) and generates an image containing the region in front. The image obtained by the camera 2 may be a color image or may be a gray image.

The camera 2 outputs a generated image through the vehicle network 4 to the ECU 3 each time generating an image.

The ECU 3 controls the vehicle 10. In the present embodiment, the ECU 3 detects from the image data of the series of images captured by the camera 2 various types of objects captured in the images (for example, cars, pedestrians, road mirrors, animals, road signs, road markings, fallen objects, other objects on the roads, etc.) and controls the vehicle 10 so that driving operations relating to acceleration, steering, and braking are automatically performed based on the detected objects. For this reason, the ECU 3 has a communication interface 21, memory 22, and processor 23.

The communication interface 21 is one example of a communicating part and has an interface circuit for connecting the ECU 3 to a vehicle network 4. That is, the communication interface 21 is connected through the vehicle network 4 to the camera 2. Further, the communication interface 21 transfers a received image to the processor 23 each time it receives an image from the camera 2.

The memory 22 is one example of a storage part and, for example, has a volatile semiconductor memory and nonvolatile semiconductor memory. Further, the memory 22 stores various types of data used in object detection processing performed by the processor 23 of the ECU 3, for example, images received from the camera 2, various types of parameters for specifying a classifier utilized for object detection processing, various types of threshold values utilized in object detection processing, etc. Furthermore, the memory 22 may also store map information etc.

The processor 23 is one example of a control part and has one or more CPU (central processing units) and their peripheral circuits. The processor 23 may further have other processing circuits such as logic processing units, numeric processing units, or graphic processing units. Further, the processor 23 performs vehicle control processing including object detection processing on a received image each time receiving an image from the camera 2 while the vehicle 10 is being driven. Specifically, the processor 23 prepares a driving plan based on the detected objects around the vehicle 10 and performs self driving automatically performing operations relating to acceleration, steering, and braking in accordance with the driving plan.

Figure 3:
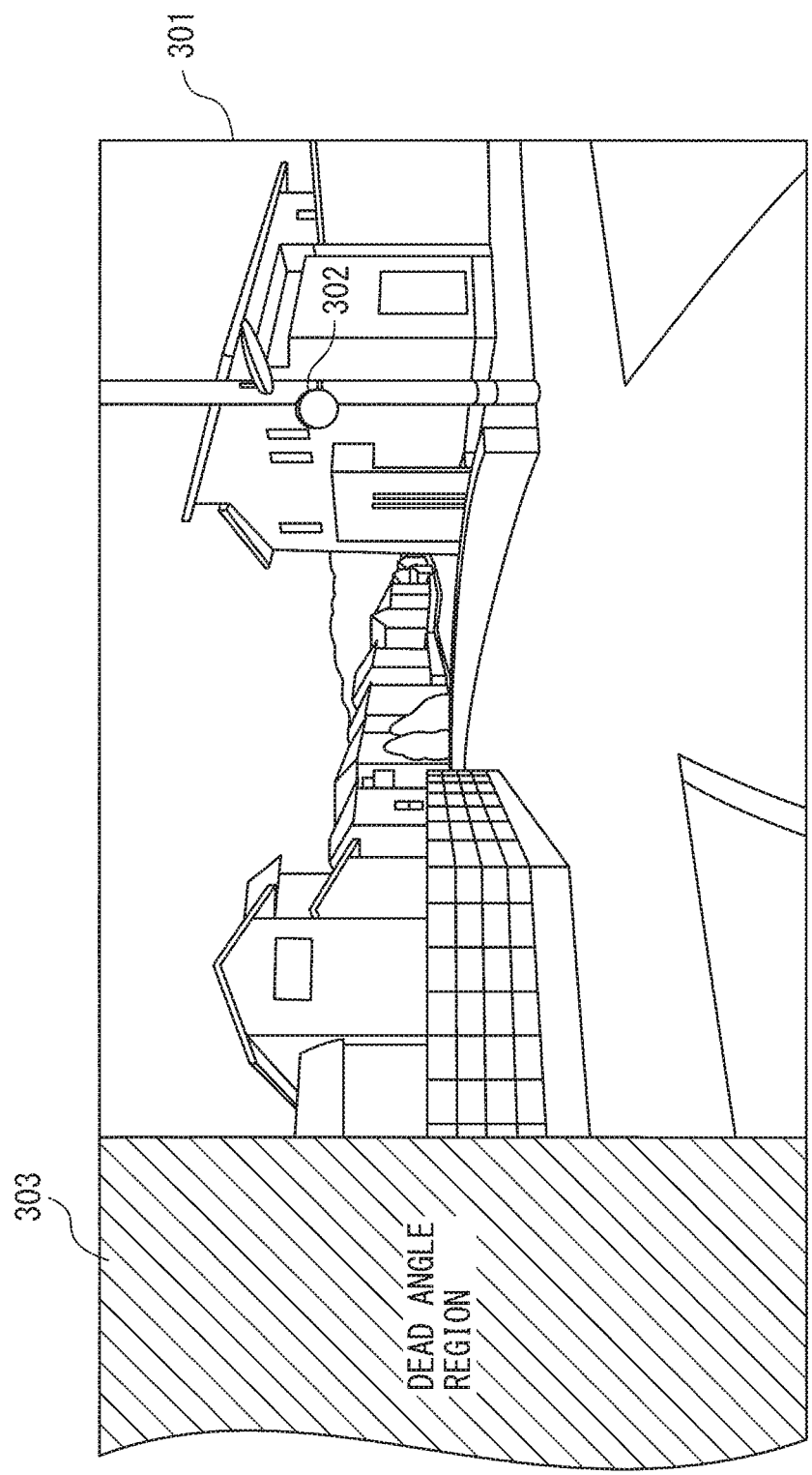
FIG. 3 is a view showing one example of an image captured by a camera.

FIG. 3 is a view showing one example of an image captured by a camera 2.

To improve the safety of a vehicle 10 engaged in self driving like in the present embodiment, in addition to detecting objects in an image 301 captured by the camera 2 etc., if there is a road mirror 302 in the image 301 captured by the camera etc., it is desirable to detect a moving object reflected in the road mirror 302 (reflected object), that is, a moving object present in a dead angle region 303 in the image 301 captured by the camera 2 etc., and prepare a driving plan of the vehicle 10 considering the behavior of the moving object present in that dead angle region 303.

However, for example, if trying to use high resolution image data to detect various types of objects to enable detection of a small size moving object reflected in a road mirror, the amount of processing of the ECU 3 (processing load) will become greater, time will be taken until object detection, and it is liable to become impossible to detect the object in real time. Further, if becoming unable to detect the object in real time, if the relative speed with the object becomes larger, it is liable to become difficult to avoid that object.

Therefore, the present embodiment configures an object detection device able to keep down the amount of processing while enabling detection of a moving object reflected in a road mirror and enable preparation of a driving plan of the vehicle 10 considering the behavior of a moving object which had been present in a dead angle of an image captured by a camera 2 etc. Below, details of the vehicle control processing including the object detection processing performed at the ECU 3 in accordance with the present embodiment will be explained.

Figure 4:
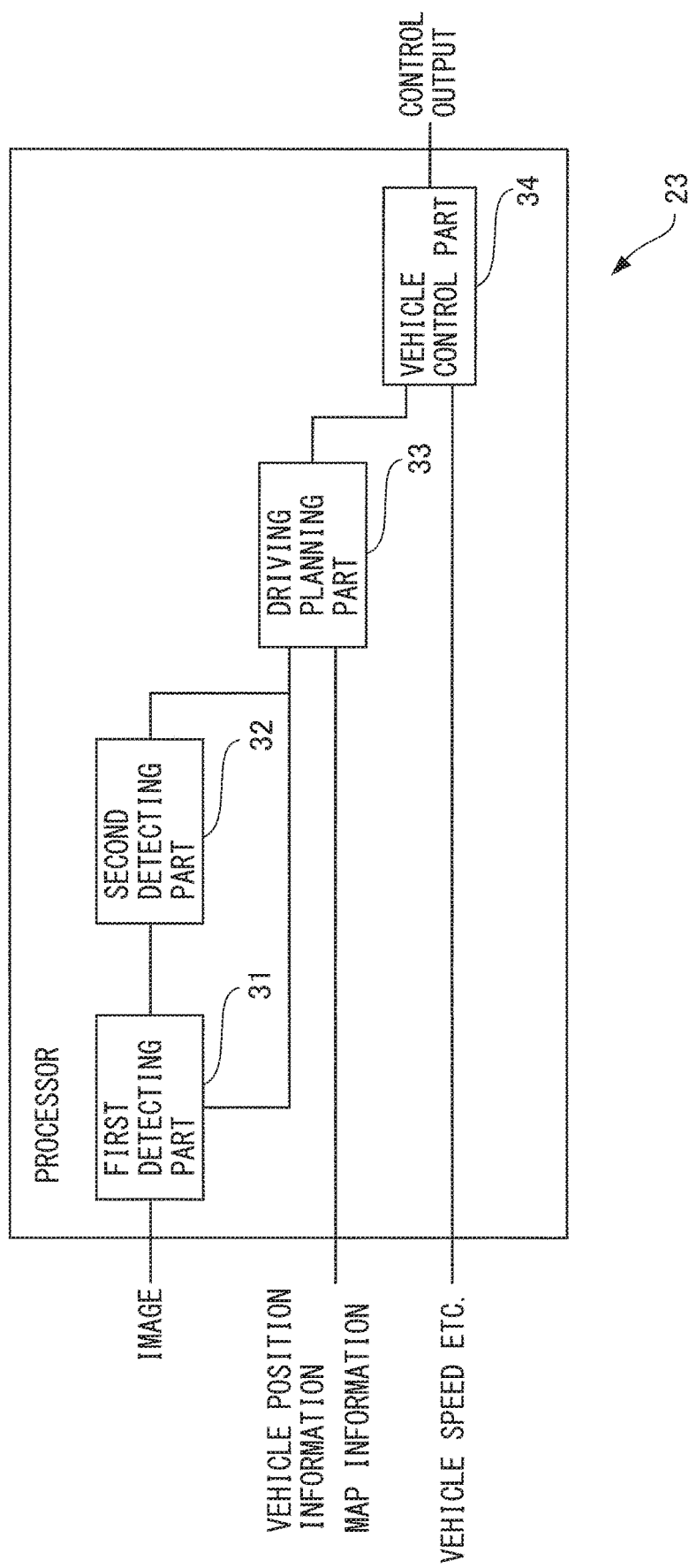
FIG. 4 is a functional block diagram of a processor of an electronic control unit relating to vehicle control processing including object detection processing.

FIG. 4 is a functional block diagram of a processor 23 of an ECU 3 relating to vehicle control processing including object detection processing.

The processor 23 has a first detecting part 31, second detecting part 32, driving planning part 33, and vehicle control part 34. These parts of the processor 23, for example, are functional modules realized by a computer program operating on the processor 23. Alternatively, these parts of the processor 23 may also be dedicated processing circuits provided in the processor 23. Among these parts of the processor 23, the first detecting part 31 and second detecting part 32 perform the object detection processing.

The first detecting part 31 inputs to a classifier the low resolution image data obtained by processing an image received from the camera 2 by resolution conversion processing to lower the resolution so as to find for each of a plurality of regions in the image the reliabilities showing the certainties of objects to be detected (for example, cars, pedestrians, road mirrors, animals, road signs, road markings, fallen objects, other objects on the road, etc.) being captured in the regions. Further, the first detecting part 31 registers the positions and ranges in the image of regions with reliabilities of a predetermined reliability threshold value or more and the types of the objects shown in those regions in a list of objects to be detected (below, "detected object list") and outputs the detected object list to the driving planning part 33.

Furthermore, if the type of the object shown in a region with a reliability of the predetermined reliability threshold value or more is a road mirror, the first detecting part 31 judges if there is a moving object in the region, that is, if the road mirror reflects a moving object. Further, the first detecting part 31 outputs a result of judgment as to if the road mirror reflects a moving object to the driving planning part 33 and, when it is judged that the road mirror reflects a moving object, outputs the position and range in the image of the region where the road mirror is shown to the second detecting part 32.

In the present embodiment, the first detecting part 31 utilizes as a classifier a DNN learned in advance so as to obtain the above output for the second detecting part 32 and driving planning part 33.

Figure 5:
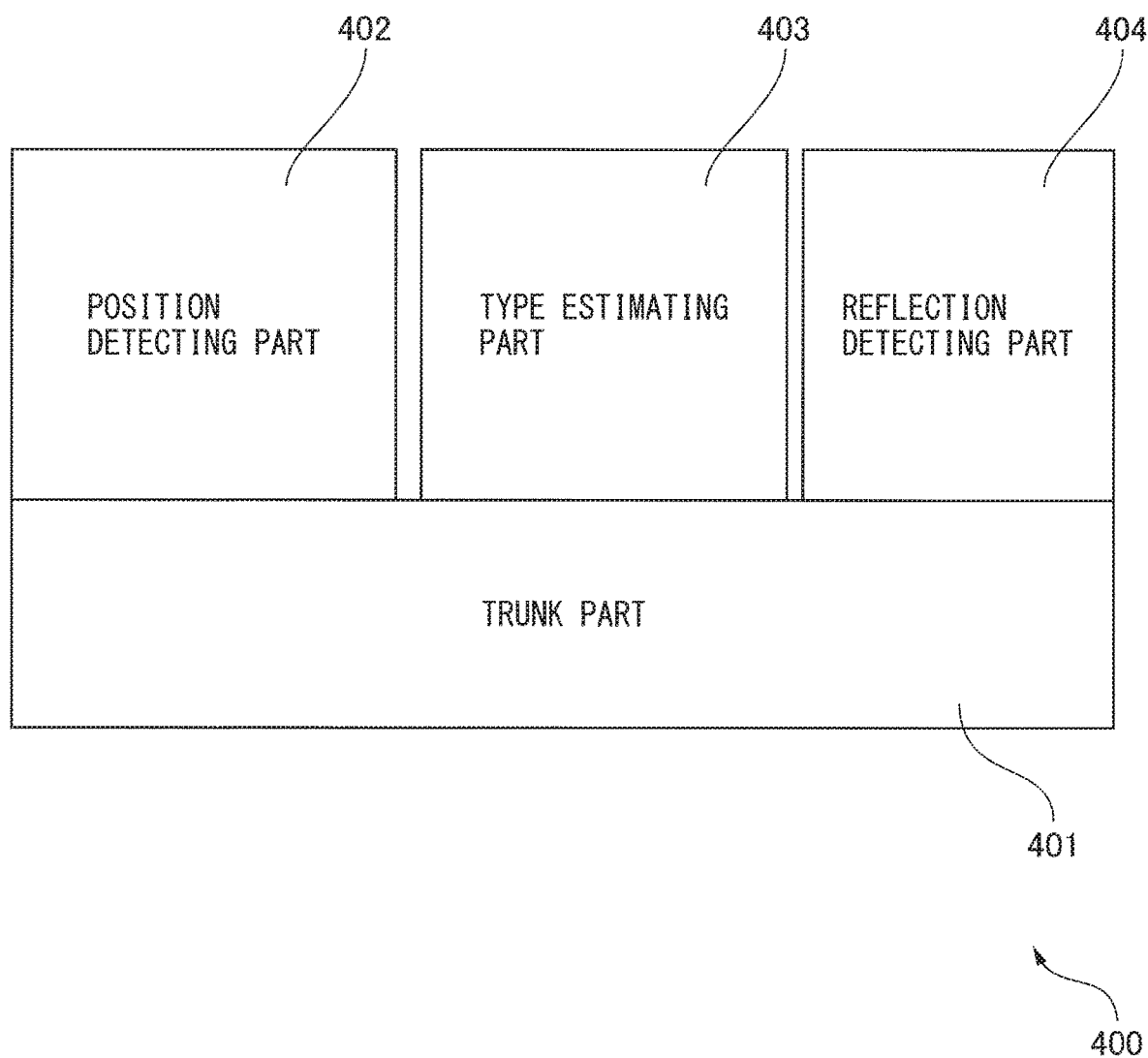
FIG. 5 is a view showing one example of the configuration of a DNN utilized as a classifier of a first detecting part.

FIG. 5 is a view showing one example of the configuration of a DNN 400 utilized as a classifier of the first detecting part 31.

The DNN 400 has a trunk part 401 which is provided at an input side where low resolution image data is input, and a position detecting part 402, type estimating part 403, and reflection detecting part 404 which are provided at an output side from the trunk part 401. Note that, two or more of the position detecting part 402, type estimating part 403, and reflection detecting part 404 may be formed integrally.

The position detecting part 402 outputs the positions and ranges of regions on an image where objects to be detected are shown based on the output from the trunk part 401.

The type estimating part 403 estimates and outputs the types of objects shown in the regions detected by the position detecting part 402 based on the output of the trunk part 401.

The reflection detecting part 404 judges if the road mirror reflects a moving object based on the output from the trunk part 401 if the object estimated by the type estimating part 403 is a road mirror and outputs that result of judgment.

The trunk part 401 can, for example, be made a convolutional neural network (CNN) having a plurality of layers connected in series from the input side to the output side. The plurality of layers include two or more convolutional layers. Furthermore, the plurality of layers of the trunk part 401 may include a pooling layer provided for every one or more convolutional layers. Still further, the plurality of layers of the trunk part 401 may contain one or more full connection layers.

For example, the trunk part 401 may be configured in the same way as the base layer of the Single Shot MultiBox Detector (SSD) described in NPL 1. In this case, the trunk part 401, in the same way as VGG-16, may be configured, in order from the input side, by two convolutional layers→a pooling layer performing MaxPooling (that is, outputting the maximum value among n×n number of inputs) (below, referred to as a "pooling layer")→two convolutional layers pooling layer three convolutional layers→pooling layer three convolutional layers pooling layer three convolutional layers→pooling layer three full connection layers. Alternatively, the trunk part 401 may be configured in accordance with another CNN architecture such as VGG-19 and AlexNet or Network-In-Network.

If image data is input, the trunk part 401 performs processing on that image data at the different layers and outputs a feature map calculated from that image data.

The position detecting part 402, the type estimating part 403, and the reflection detecting part 404 respectively receive as input the feature map output from the trunk part 401. Further, the position detecting part 402, the type estimating part 403, and the reflection detecting part 404 may respectively be made, for example, CNNs having pluralities of layers connected in series from the input side to the output side. In the position detecting part 402, the type estimating part 403, and the reflection detecting part 404, the pluralities of layers of the CNNs may include two or more convolutional layers.

Further, in the position detecting part 402, the type estimating part 403, and the reflection detecting part 404, the pluralities of layers of the CNNs may include a pooling layer provided for each one or more convolutional layers. Note that, the convolutional layers and pooling layers of the CNNs may be shared by two or more of the position detecting part 402, the type estimating part 403, and the reflection detecting part 404. Furthermore, in the position detecting part 402, the type estimating part 403, and the reflection detecting part 404, the plurality of layers may include one or more full connection layers. In this case, the full connection layers are preferably provided at the output sides from the convolutional layers. Further, the full connection layers may directly receive as input the outputs from the convolutional layers.

The images (teacher images) contained in the teacher data utilized for learning of the DNN 400 are tagged with the types of objects detected and boxes bounding the objects showing the regions in which the objects detected are shown. Further, in the present embodiment, in the teacher images, as the attribute information for the bounding box surrounding a road mirror, information as to whether a moving object is reflected in it is attached as a tag. Furthermore, in the teacher image, the pixels of the moving object in the pixels included in the region in which the road mirror surrounded by the bounding box is shown are tagged as being a moving object reflected in the road mirror.

The DNN 400 is for example learned by the learning method called error back propagation using such a large number of teacher images. The first detecting part 31 can utilize such a learned DNN 400 as a classifier to precisely detect objects to be detected from the image data, in particular, objects for which large numbers of teacher images can be prepared, and to precisely judge if a road mirror reflects a moving object. In the present embodiment, by making the reflection detecting part 404 learn tag information as to whether the mirror reflects a moving object as attribute information for the bounding box surrounding the road mirror, the reflection detecting part 404 can estimate a two-class classification problem of whether the mirror reflects a moving object.

Based on the position and range in the image of the region in which the road mirror is shown output from the first detecting part 31, the second detecting part 32 processes the image received from the camera 2 before resolution conversion processing (that is, high resolution image data) by image extraction processing to partially extract the region in which the road mirror is shown as a region of interest (ROI) to generate high resolution partial image data. Further, the second detecting part 32 inputs this high resolution partial image data to a classifier to find the reliability showing the certainty of a region capturing a moving object to be detected for each of a plurality of regions in the partial image. Further, the second detecting part 32 registers positions and ranges in the partial image of regions with a reliability of a predetermined reliability threshold value or more and the types of moving objects shown in those regions in a list of moving objects reflected in the road mirror (below, referred to as a "mirror moving object list") and outputs the mirror moving object list to the driving planning part 33.

In the present embodiment, the second detecting part 32 utilizes as a classifier a DNN learned in advance so as to obtain the above output at the driving planning part 33.

Figure 6:
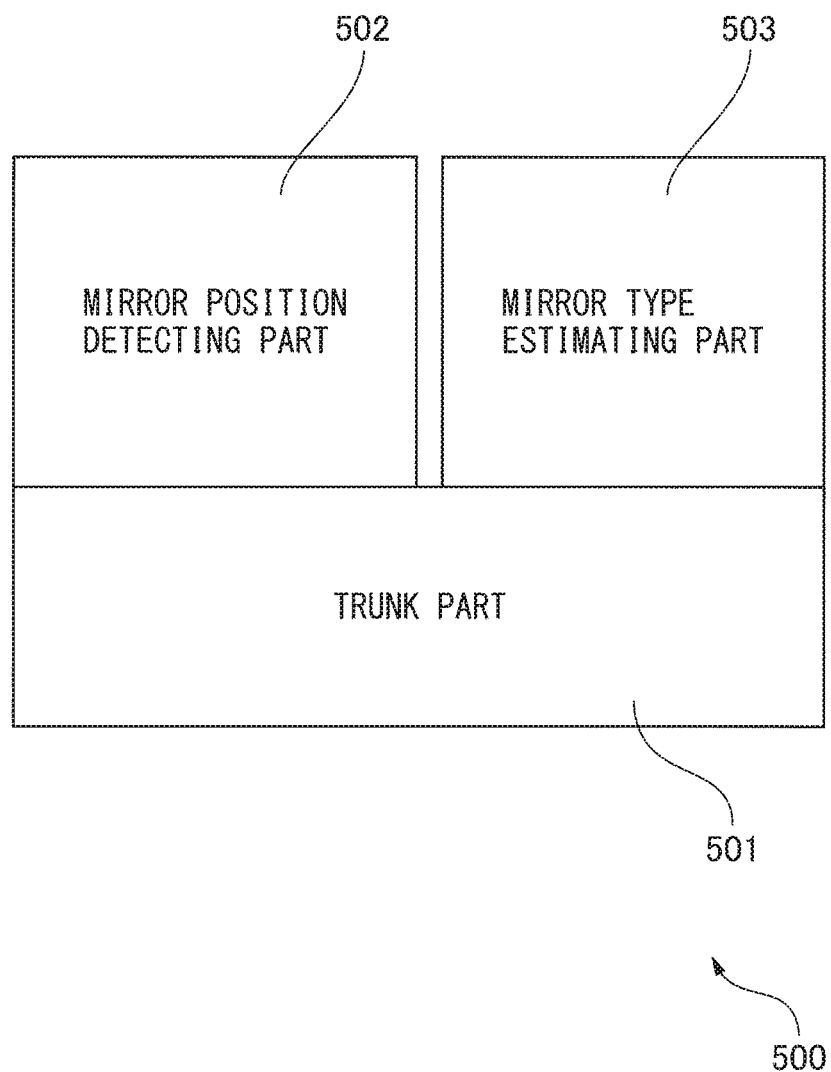
FIG. 6 is a view showing one example of the configuration of a DNN utilized as a classifier of a second detecting part.

FIG. 6 is a view showing one example of the configuration of a DNN 500 utilized as a classifier of the second detecting part 32.

The DNN 500 has a trunk part 501 provided at an input side to which high resolution image data is input and a mirror position detecting part 502 and a mirror type estimating part 503 provided at an output side from the trunk part 501. Note that, the mirror position detecting part 502 and mirror type estimating part 503 may be integrally formed.

The mirror position detecting part 502 outputs the bounding box of the region in which the object to be detected on the image is shown based on the output from the trunk part 501.

The mirror type estimating part 503 estimates the type of the object shown in the region detected by the mirror position detecting part 501 based on the output from the trunk part 501.

The trunk part 501 can be configured in the same way as the trunk part 401 of the DNN 400 utilized as the classifier in the first detecting part 31 explained with reference to FIG. 4. If image data is input, it processes the image data at the different layers and outputs the feature map calculated from the image data.

The mirror position detecting part 502 and mirror type estimating part 503 respectively receive as input the feature map output from the trunk part 501. Further, the mirror position detecting part 502 and the mirror type estimating part 503 can also be configured in the same way as position detecting part 402 and the type estimating part 403 of the DNN 400 utilized as the classifier in the first detecting part 31 explained with reference to FIG. 4.

The image contained in the teacher data utilized for learning of the DNN 500 (teacher image) is tagged with the type of the moving object reflected in the road mirror detected and a bounding box of the object showing the region showing the moving object detected.

The DNN 500 is learned by the learning method such as error back propagation using such a large number of teacher images. The second detecting part 32 can utilize such a learned DNN 500 as a classifier to precisely detect a moving object detected from the partial image data, in particular, a moving object for which a large number of teacher images can be prepared.

In this way, in the object detection processing according to the present embodiment, first the first detecting part 31 uses a low resolution image to detect the positions and ranges of objects in an image and the types of the objects, so can keep down the amount of processing for detecting objects in an image compared with the case of using a high resolution image captured by the camera 2 as it is.

Further, the first detecting part 31 is designed to output the position and range in an image of the region in which a road mirror is shown to the second detecting part 32 when it is judged that the road mirror reflects a moving object. That is, the first detecting part 31 is designed to output the position and range in an image of the region in which a road mirror is shown to the second detecting part 32 only when it is judged that the road mirror reflects a moving object.

Therefore, in other words, the second detecting part 32 uses the high resolution partial image obtained by extracting the part of the road mirror from the high resolution image captured by the camera 2 so as to detect in detail a moving object reflected in the road mirror only when it is judged at the first detecting part 31 that the road mirror reflects a moving object.

For this reason, compared to the case of using as is a high resolution image captured by the camera 2 so as to detect in detail a moving object reflected in a road mirror at all times, it is possible to keep down the amount of processing for detecting a moving object in a road mirror. Further, when detecting in detail a moving object reflected in a road mirror, since a high resolution partial image is used, it is possible to precisely detect the moving object reflected in the road mirror.

The driving planning part 33 tracks movement of objects based on the positions of the objects in the detected object list, that is, the positions of the objects shown in the image captured by the camera 2. That is, the driving planning part 33 detects behaviors of the objects (for example, directions of advance, whether in stopped state, etc.) based on changes along with time of the positions of the objects in the detected object list.

Further, if it is judged that a road mirror reflects a moving object, the driving planning part 33 further tracks the movement of the moving object based on the position of the moving object in the mirror moving object list, that is, the position of the moving object reflected in the road mirror in the image captured by the camera 2. That is, if it is judged that the road mirror reflects a moving object, the driving planning part 33 further detects the behavior of the moving object based on a change along with time of the position of the moving object in the mirror moving object list.

Further, if it is judged that a road mirror does not reflect a moving object, the driving planning part 33 prepares the driving plan of the vehicle 10 and notifies the prepared driving plan to the vehicle control part 34 based on the behaviors of the objects in the detected object list (results of tracking) so that the vehicle 10 does not collide with these objects while considering the behavior of a moving object at the time it is judged that road mirror reflects a moving object. At this time, the driving planning part 33 may also, for example, prepare the driving plan of the vehicle 10 while referring to the current position information of the vehicle 10 obtained from a GPS receiver (not shown) mounted in the vehicle 10 and map information stored in the memory 22.

In this case, for example, if the direction of advance of a moving object when it is judged that the road mirror reflects the moving object is a direction heading to a home vehicle, the driving planning part 33 prepares the driving plan of the vehicle 10 while judging if a predetermined time (for example, several seconds) has elapsed from when the moving object disappears from the road mirror (that is, from when it is judged the road mirror does not reflect the moving object) and, further, if there isn't an object which may collide with the home vehicle within a predetermined time among the objects in the detected object list or otherwise there is a possibility of collision with another vehicle.

On the other hand, if it is judged that the road mirror reflects a moving object, the driving planning part 33 prepares a driving plan of the vehicle 10 and notifies the prepared driving plan to the vehicle control part 34 based on the behaviors of the objects in the detected object list (results of tracking) and the behavior of the moving object in the mirror moving object list (results of tracking) so that the vehicle 10 does not collide with the objects and moving objects while considering the behavior of another moving object (results of tracking) at the time it is judged that road mirror reflects another moving object.

In this case, for example, if the direction of advance of the other moving object when it is judged that the road mirror reflects another moving object is a direction heading to the home vehicle, the driving planning part 33 prepares the driving plan of the vehicle 10 while judging if a predetermined time has elapsed from which the other moving object disappears from the road mirror and, further, if there isn't an object which may collide with the home vehicle within a predetermined time among the objects in the detected object list or the road mirror reflects the moving object, but the moving object has stopped for a predetermined time or more or otherwise there is a possibility of collision with another vehicle.

Note that the driving plan is, for example, shown as a set of target positions of the vehicle 10 at different times from the current time to a predetermined destination time.

In this way, according to the present embodiment, it is possible to prepare a driving plan based on the behaviors of objects in an image captured by the camera 2 and the behavior of a moving object present at a dead angle reflected in a road mirror in the image, so it is possible to improve the safety of self driving.

Note that in the present embodiment, the driving planning part 33 prepares a driving plan causing the vehicle 10 to decelerate once to secure safety at a point of time of judging that a road mirror reflects a moving object, that is, at a point of time that the first detecting part 31 outputs a result of judgment that a road mirror reflects a moving object.

Due to this, the vehicle 10 can be made to decelerate at the point of time that the first detecting part 31 detects a road mirror reflecting some sort of object, so the safety of self driving can be improved more. Further, by making the vehicle 10 decelerate, as a result, it is possible to secure the processing time for the second detecting part 32 to detect the behavior of the moving object reflected in the road mirror.

Further, as a modification of the present embodiment, in preparing a driving plan, if shifting from a state where a road mirror reflects a moving object to a state where it does not reflect it, when the direction of advance of the moving object which had been reflected in the road mirror was a direction heading toward the home vehicle (below, referred to as the "home vehicle direction"), it is possible to perform template matching using an image of the moving object which had been reflected in the road mirror as the template image for the image when shifting to the state which does not reflect the object (image captured by camera 2 or image obtained by lowering the resolution of that image). Further, by this template matching, it is also possible to judge if there is a moving object which had been reflected in a road mirror (that is, a moving object in the mirror moving object list) in the objects reflected in the image (that is, objects in the detected object list) when shifting to a state where the road mirror does not reflect a moving object.

Due to this, when, as a result of the template matching, it is judged that the objects in the detected object list do not include a moving object reflected in the road mirror, it is possible to grasp that there is a possibility of presence of a moving object hidden in a dead angle region not reflected in the road mirror or in the image captured by the camera 2 and moving in the home vehicle direction. For this reason, it is possible to prepare a driving plan not colliding with such a moving object, so it is possible to further improve the safety of self driving.

Further, as a modification of the present embodiment, the second detecting part 32 processes the image received from the camera 2 (that is, high resolution image data) before resolution conversion processing by image extraction processing partially extracting the region shown as a road mirror as a region of interest (ROI) based on the position and range in the image of the region in which the road mirror is shown output from the first detecting part 31 to generate high resolution partial image data and uses the time series data of the partial image to calculate the optical flow. Further, the second detecting part 32 can also input to the classifier an optical flow as an additional channel in addition to this high resolution partial image data so as to find more precisely the reliability of each of a plurality of regions in that partial image capturing that moving object to be detected.

For example, if the input image comprises three channels of RGB, the second detecting part 32 calculates an optical flow comprised of a total of two channels of a horizontal component and vertical component of an optical flow for an image and inputs five channels of input combining the three channels of image input and two channels of optical flow to the DNN 500. In this case, the DNN 500 is learned using teacher data comprised of five channels of input including the optical flow in addition to the image information. The optical flow includes information relating to movement of objects in the pixels, so the DNN 500 can detect a moving object more precisely. Calculation of the optical flow takes processing, but in the embodiment, the optical flow is calculated only with respect to the bounding box of the mirror in which the moving object is reflected, so it is possible to realize high precision detection of a moving object while reducing as much as possible the amount of processing.

The vehicle control part 34 controls the various types of controlled parts required for performing driving operations relating to acceleration, steering, and braking in accordance with the notified driving plan and automatically performs the driving operations of the vehicle 10. The vehicle control part 34 receives as input various types of parameters required for performing such self driving according to need (for example, the vehicle speed detected by a vehicle speed sensor (not shown) etc.).

Figure 7:
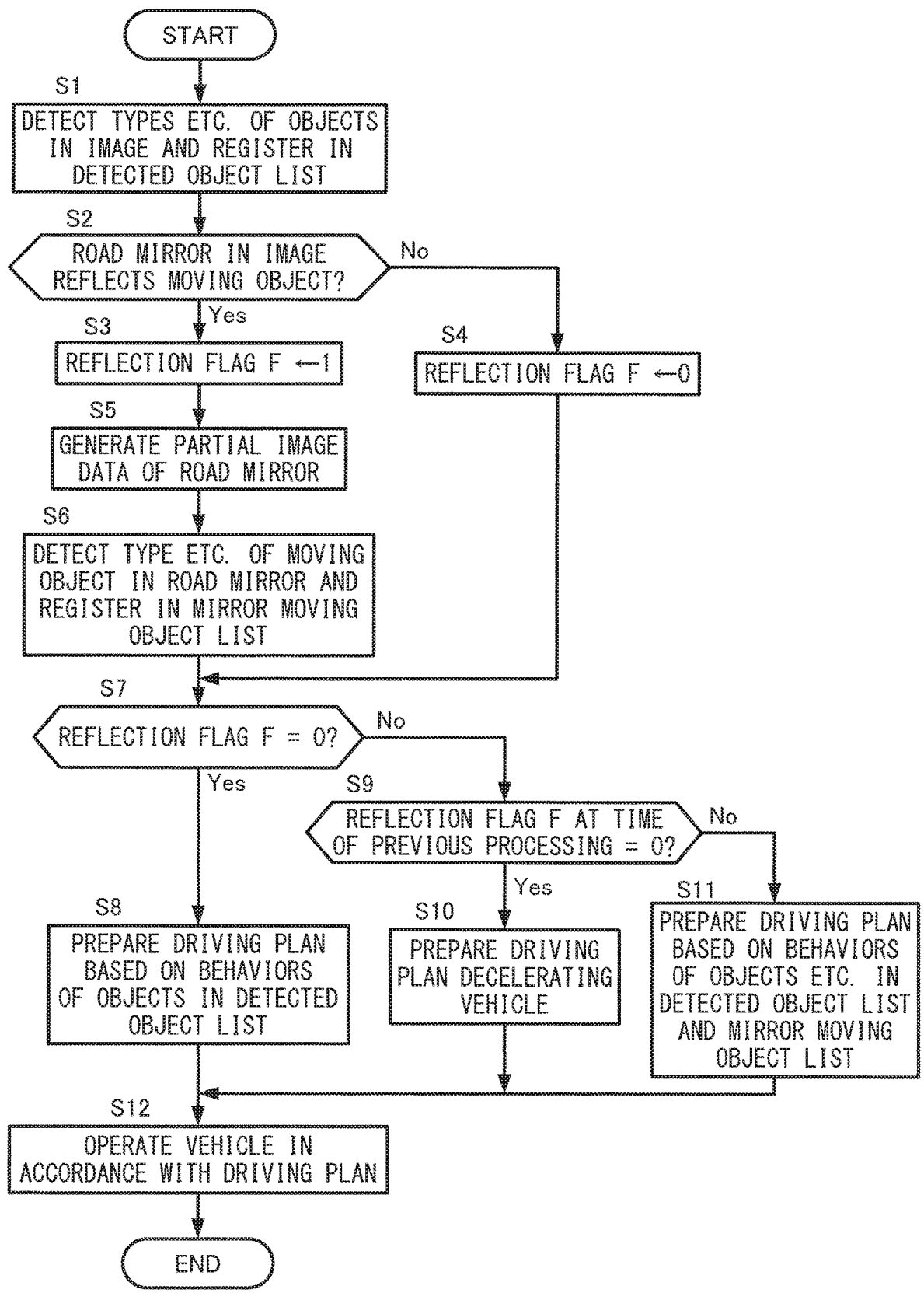
FIG. 7 is an operation flow chart of vehicle control processing including object detection processing.

FIG. 7 is an operation flow chart of vehicle control processing including object detection processing performed by the processor 23. The processor 23 performs vehicle control processing in accordance with an operation flow chart shown in FIG. 6 each time receiving an image from the camera 2. Note that, in the operation flow chart shown below, the processing of steps S1 to S6 corresponds to object detection processing.

At step S1, the processor 23 processes an image received from the camera 2 by resolution conversion processing to lower the resolution and inputs the low resolution image data to the classifier of the first detecting part 31 to detect the positions and ranges of objects in the image and the types of the objects and registers these at the detected object list.

At step S2, the processor 23 judges if there is a road mirror in the objects in the image and if that road mirror is reflecting a moving object. The processor 23 proceeds to the processing of step S3 if there is a road mirror in the objects in the image and if that road mirror reflects a moving object. On the other hand, the processor 23 proceeds to the processing of step S4 if there is no road mirror in the objects in the image or if there is a road mirror but it does not reflect a moving object.

At step S3, the processor 23 sets a reflection flag F to "1". The reflection flag F is a flag which is set to "1" if the objects in an image include a road mirror and it is judged that the road mirror reflects a moving object. Its initial value is set to "0".

At step S4, the processor 23 sets the reflection flag F to "0".

At step S5, the processor 23 processes an image received from the camera 2 before resolution conversion processing based on the position and range of the road mirror (that is, high resolution image data) to perform image extraction processing for partially extracting the region in which the road mirror is shown as a region of interest (ROI) to generate high resolution partial image data.

At step S6, the processor 23 inputs the high resolution partial image data to the classifier of the second detecting part 32 to thereby detect the position and range of the moving object in the road mirror and the type of the moving object and registers these in the mirror moving object list.

At step S7, the processor 23 judges if the reflection flag F has been set to "0". The processor 23 proceeds to the processing of step S8 if the reflection flag F is set to "0". On the other hand, the processor 23 proceeds to the processing of step S9 if the reflection flag F is set to "1".

At step S8, since the reflection flag F is "0" and it is judged that the road mirror does not reflect a moving object, the processor 23 prepares a driving plan for the vehicle 10 based on behavior of objects in the detected object list (tracking results) so that the vehicle 10 will not collide with these objects while considering behavior of the moving object when, as explained above, it was judged that the road mirror reflected a moving object.

At step S9, the processor 23 judges if the reflection flag F had been set to "0" in the previous processing. The processor 23 proceeds to the processing of step S10 if the reflection flag F had been set to "0" in the previous processing. On the other hand, the processor 23 proceeds to the processing of step S11 if the reflection flag F had been set to "1", in the previous processing.

At step S10, the processor 23 prepares a driving plan causing the vehicle 10 to decelerate to secure safety once when the reflection flag F changes from "0" to "1", that is, when the road mirror is detected as reflecting some sort of moving object.

At step S11, since the reflection flag F is "F" and it is judged that the road mirror reflects a moving object, the processor 23 prepares a driving plan for the vehicle 10 based on the behavior of objects in the detected object list (tracking results) and further behavior of a moving object in the mirror moving object list (tracking results) so that the vehicle 10 will not collide with these objects and the moving object while considering behavior of another moving object (tracking results) when, as explained above, it was judged that the road mirror reflects another moving object.

At step S12, the processor 23 controls various types of controlled parts required for driving operations relating to acceleration, steering, and braking in accordance with the prepared driving plan and automatically performs driving operations of the vehicle 10.

The object detection device according to the present embodiment explained above is provided with a first detecting part 31 detecting types and positions of objects including a road mirror in an image and the presence of a moving object reflected in the road mirror (movable object) based on image data of a low resolution image and a second detecting part 32 detecting a type of a moving object in the road mirror (movable object) and a position of the movable object in the road mirror based on high resolution partial image data obtained by extracting the part of the road mirror from the image if there is a movable object reflected in the road mirror.

According to the object detection device according to the present embodiment, the first detecting part 31 first uses the low resolution image to detect the types and positions of the objects including the road mirror in the image, so compared to when using the high resolution image captured by the camera 2 as is, it is possible to keep down the amount of processing for detecting the types and positions of the objects in the image.

Further, the second detecting part 32 is designed to use the high resolution partial image obtained by extracting the part of the road mirror from the high resolution image captured by the camera 2 to detect the type or position of a moving object in the road mirror only when it is judged by the first detecting part 31 that there is a reflected object in the road mirror. For this reason, compared to the case of using as is the high resolution image captured by the camera 2 so as to detect the type or position of a moving object reflected in a road mirror at all times, it is possible to keep down the amount of processing for detecting the type or position of the moving object reflected in the road mirror. Further, when detecting the type or position of a moving object reflected in a road mirror, since using a high resolution partial image, it is possible to precisely detect the type or position of a moving object present in a dead angle reflected in the road mirror.

Further, the first detecting part 31 detects the positions of objects in an image captured by the camera 2, while the second detecting part 32 detects the position of a moving object in a road mirror. The object detection device according to the present embodiment independently detects these.

Here, the coordinate system in the road mirror differs from the coordinate system in an image captured by a camera 2 other than the road mirror in accordance with the optical arrangement of the road mirror with respect to the vehicle 10 (for example, to what extent the road mirror is slanted from the vehicle 10 from the state where they face each other etc.). Therefore, even if detecting the position of a moving object in a road mirror in an image captured by the camera 2 and tracking movement of the moving object, that moving object will move in a coordinate system different from the coordinate system on the image captured by the camera 2, so it will be difficult to obtain a grasp of toward which direction that moving object is actually moving.

As opposed to this, in the present embodiment, the second detecting part 32 independently detects the position of a moving object in the road mirror, so can detect the behavior of the moving object according to the coordinate system in the road mirror. Therefore, it is possible to precisely predict the behavior of the moving object reflected in the road mirror.

Further, according to the present embodiment, the first detecting part 31 is configured to input image data to a neural network (DNN 400) having learned convolutional layers learned using teacher data comprised of a first learning-use image, type and position of an object in the first learning-use image, and presence of a moving object reflected in the road mirror linked together so as to detect the type and position of an object in the image and the presence of a moving object reflected in the road mirror image. The second detecting part 32 is configured to input partial image data to a neural network (DNN 500) having learned convolutional layers learned using teacher data comprised of a second learning-use image in which a road mirror is contained and the type and position of a moving object reflected in the road mirror in the second learning-use image linked together so as to detect the type of the moving object in the road mirror and the position of the moving object in the road mirror.

Due to this, it is possible to precisely detect the types and positions etc. of objects in an image by the DNNs 400, 500 learned using a large number of teacher images.

Further, the vehicle control system according to the present embodiment is provided with a camera 2 for capturing an image and an object detection device is mounted in the system. The system is further provided with a driving planning part 33 preparing a driving plan of a vehicle 10 based on time series data of the positions of objects in an image and time series data of a position of a moving object in a road mirror and a vehicle control part 34 operating the vehicle 10 according to the driving plan.

In this way, it is possible to prepare a driving plan based on the behaviors of objects in an image captured by the camera 2 and the behavior of a moving object present at a dead angle reflected in a road mirror in the image and operate the vehicle 10 in accordance with the driving plan to thereby improve the safety of self driving.

Further, the driving planning part 33 according to the present embodiment is further configured to prepare a driving plan based on the presence of a moving object reflected in the road mirror and is designed to prepare a driving plan causing the vehicle 10 to decelerate when the presence of a moving object reflected in the road mirror is detected by the first detecting part 31.

Due to this, it is possible to make the vehicle 10 decelerate at the point of time when some sort of object is detected at the first detecting part 31 as being reflected in the road mirror, so it is possible to further improve the safety of self driving. Further, by decelerating the vehicle 10, it is possible as a result to secure a processing time for the second detecting part 32 to detect the type and position of the moving object reflected in the road mirror.

Further, according to a modification of the present embodiment, the driving planning part 33 is designed so that when shifting from the state where it is judged there is the movable object reflected in the road mirror to a state where it is judged there isn't one, it prepares the driving plan after judging if the objects in the image include a movable object which had been reflected in the road mirror.

By judgment in this way, it is possible to obtain a grasp of the possibility of there being a moving object heading in the home vehicle direction hidden in a dead angle region where it is not reflected in the road mirror and not captured by an image captured by the camera 2. For this reason, it is possible to prepare a driving plan where the vehicle does not collide with such a moving object, so it is possible to further improve the safety of self driving.

Above, embodiments of the present disclosure were explained, but the above embodiments only show some of the examples of application of the present disclosure. It is not mean to limit the technical scope of the present disclosure to the specific configurations of the above embodiments.

For example, the vehicle 10 may be provided with a plurality of cameras 2. In this case, the processor 23 may perform object detection processing by the first detecting part 31 and second detecting part 32 on the image obtained from that camera 2 for each camera 2. Further, the processor 23 may perform processing by the driving planning part 33 and vehicle control part 34 based on an object detected from images obtained from the cameras.

Further, the first detecting part 31 and the second detecting part 32 may also utilize a classifier other than a DNN.

Further, the second detecting part 32 may also track movements of moving objects registered in a mirror moving object list and detect behaviors of the moving objects.

Further, a computer program realizing the functions of the parts of the processor 23 of the object detection device may be provided in a form recorded in a computer readable portable recording medium such as a semiconductor memory, magnetic recording medium, or optical recording medium.

The invention claimed is:

1. An object detection device comprising:
   a first detecting part configured to detect types and positions of objects including a road mirror in an image and a presence of a movable object reflected in the road mirror based on image data of a low resolution image; and
   a second detecting part configured to detect a type of the movable object in the road mirror and a position of the movable object in the road mirror based on high resolution partial image data obtained by extracting the part of the road mirror from the image if there is the movable object reflected in the road mirror.

2. The object detection device according to claim 1, wherein
   the first detecting part is configured to input the image data to a neural network having a learned convolutional layer learned using teacher data linking a first learning-use image, types and positions of objects in the first learning-use image, and presence of the movable object reflected in the road mirror so as to thereby detect the types and positions of the objects in the image and the presence of the movable object reflected in the road mirror.

3. The object detection device according to claim 1, wherein
   the second detecting part is configured to input partial image data to a neural network having a learned convolutional layer learned using teacher data linking a second learning-use image containing the road mirror and a type and position of the movable object reflected in the road mirror in the second learning-use image so as to thereby detect the type of the movable object in the road mirror and the position of the movable object in the road mirror.

4. A vehicle control system provided with a camera for capturing the image and in which the object detection device according to claim 1 is mounted,
   the vehicle control system comprising:
   a driving planning part configured to prepare a driving plan of a vehicle based on time series data of positions of the objects in the image and time series data of a position of the movable object in the road mirror; and
   a vehicle control part configured to operate the vehicle in accordance with the driving plan.

5. The vehicle control system according to claim 4, wherein
   the driving planning part is further configured to prepare the driving plan based on a presence of the movable object reflected in the road mirror, and
   the driving planning part prepares a driving plan causing the vehicle to decelerate when it is judged at the first detecting part that there is the movable object reflected at the road mirror.

6. The vehicle control system according to claim 4, wherein
   the driving planning part is further configured so that when shifting from a state where it is judged there is the movable object reflected in the road mirror to a state where it is judged there isn't one, it prepares the driving plan after judging if the objects in the image include the movable object which had been reflected in the road mirror.

7. An object detection method comprising:
   detecting types and positions of objects including a road mirror in an image and a presence of a movable object reflected in the road mirror based on image data of a low resolution image; and
   detecting a type of the movable object in the road mirror and a position of the movable object in the road mirror based on high resolution partial image data obtained by extracting the part of the road mirror from the image if there is the movable object reflected in the road mirror.

8. A non-transitory computer readable medium comprising a computer program for object detection-use causing a computer to:

detect types and positions of objects including a road mirror in an image and a presence of a movable object reflected in the road mirror based on image data of a low resolution image; and detect a type of the movable object in the road mirror and a position of the movable object in the road mirror based on high resolution partial image data obtained by extracting the part of the road mirror from the image if there is the movable object reflected in the road mirror.

\* \* \* \* \*